W. W. STEWART.
Syringe or Liquid Dropper.
No. 208,273.              Patented Sept. 24, 1878.
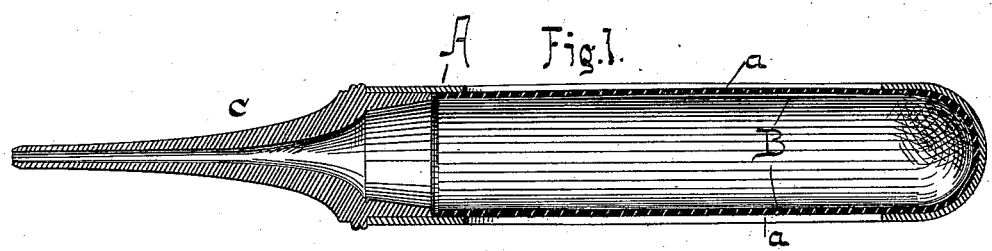
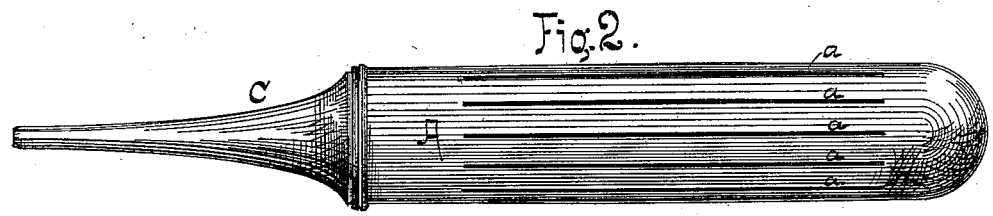
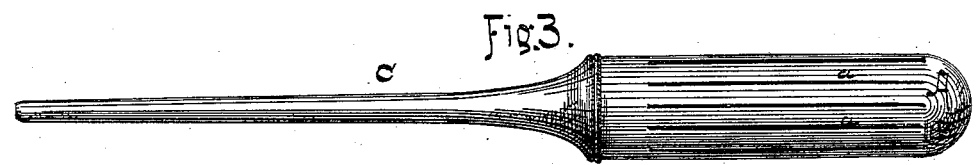
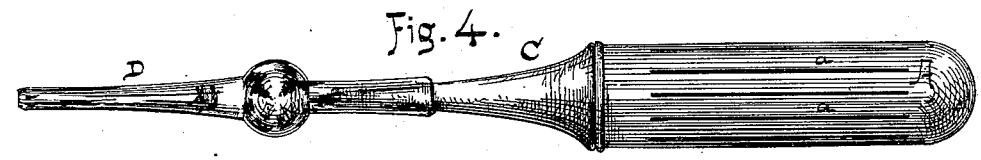
Attest
A. H. Smith
N. B. Smith
Inventor.
W. W. Stewart.
By his Atty.
R. D. Smith

UNITED STATES PATENT OFFICE.

WILLIAM W. STEWART, OF BROOKLYN, NEW YORK.

IMPROVEMENT IN SYRINGES OR LIQUID-DROPPERS.

Specification forming part of Letters Patent No. 208,273, dated September 24, 1878; application filed August 16, 1878.

*To all whom it may concern:*

Be it known that I, WM. W. STEWART, of Brooklyn, in the county of Kings and State of New York, have invented a new and useful Improvement in Syringes, suitable for dental and other purposes, of which the following is a full and exact description, reference being had to the accompanying drawings, wherein—

Figure 1 represents, in longitudinal section, my improvement. Fig. 2 represents the same in elevation; Figs. 3 and 4, modifications in form to adapt the improvement to different circumstances of use.

I am aware that syringes have heretofore been made with bulbs of elastic soft rubber, and that oil-cans have been made with elastic metallic bottoms, in both cases an action similar to mine being produced; but neither of the devices named is applicable to the purposes of a dental syringe, which is, primarily, the object I have in view, for the reason that the elastic-bulb syringe cannot offer to the fingers the necessary combination of rigidity and elasticity necessary to the successful manipulation with the fingers of one hand of a delicate instrument like the dental syringes, and the elastic metallic bottom requires too much expanse of area to render such a device applicable.

I therefore provide a case of rigid material, which I make sufficiently flexible by perforations, so that the rigidity of said case will maintain the general shape of the implement, and enable it to be held and managed conveniently by the fingers of one hand, while the perforation will render the same sufficiently elastic to enable pressure from the fingers to cause the inclosed fluid to be ejected; and I cover said slits on the inner side with soft elastic substance, such as soft rubber, to prevent the escape of the contained liquid, so that my reservoir is composed of a rigid part, made slightly flexible by perforations, and a soft elastic lining to cover the perforations of the rigid part.

That others may fully understand my invention, I will more particularly describe it.

A is the case of my syringe, made of any suitable material, and preferably placed outside of the soft material. I think hard rubber preferable to all others, though that material may be less suitable than others when the implement is designed for some special use.

The case A is perforated with slits $a$, arranged longitudinally, spirally, or otherwise, as may be found desirable. These slits extend over a section in length sufficient to permit the required amount of flexibility. Within the case A, and covering the slits $a$, there is a lining, B, of soft rubber or other flexible substance, impervious to the contained liquid. The lining is generally cemented to the wall or case A, although this is not always essential. One end of the case A is open, and admits the free entrance of the liquid to be used when the syringe is to be filled.

The nozzle C is fitted at its base to the open end of the case A, and may be secured therein in any suitable way by screw-thread, friction, or any manner of binding device. When the case A is to be discharged, the nozzle may be removed.

By providing these syringes with nozzles of different lengths the implement may be fitted for various uses, such as sampling liquids, drop-measuring, &c., the methods of such uses being so evident that no description is required here.

In Fig. 3 a syringe with a long bill is shown, suitable for sampling, dropping, &c. In Fig. 4 the syringe is shown with a detachable glass nose, D, with a bulb suitable for handling small quantities of acids, &c.

Having described my invention, what I claim as new is—

1. A syringe having a reservoir composed of a case, A, of rigid material, made flexible by perforations, substantially as described, combined with a soft elastic covering, B, for said perforations, substantially as described and shown.

2. A syringe having a reservoir composed of an outer case, A, made flexible by slits $a$, combined with a soft elastic bulb, B, inclosed within said case, and a nozzle, C, substantially as set forth.

WILLIAM W. STEWART.

Witnesses:
 THEO. RICKSECKER,
 C. S. NASH.